United States Patent [19]
Collins et al.

[11] Patent Number: 5,169,660
[45] Date of Patent: Dec. 8, 1992

[54] METHOD OF PRODUCING STABLE BRAN AND FLOUR PRODUCTS FROM CEREAL GRAINS

[75] Inventors: Frank W. Collins, Ottawa; David Paton, Saskatoon, both of Canada

[73] Assignee: Her Majesty the Queen in right of Canada, as represented by the Minister of Agriculture, Ottawa, Canada

[21] Appl. No.: 671,073

[22] Filed: Mar. 18, 1991

[30] Foreign Application Priority Data

Mar. 27, 1990 [CA] Canada .................................. 2013190

[51] Int. Cl.$^5$ .............................................. A23L 1/052
[52] U.S. Cl. ..................................... 426/271; 426/430; 426/436; 426/489; 426/622
[58] Field of Search ............... 426/592, 655, 656, 429, 426/430, 436, 271, 459, 460, 489, 478, 507, 622

[56] References Cited

U.S. PATENT DOCUMENTS

| | | | |
|---|---|---|---|
| 1,204,869 | 11/1916 | Heuser | 426/31 |
| 1,564,181 | 12/1925 | Kellogg | 426/28 |
| 2,466,261 | 4/1949 | Musher | 426/459 |
| 2,554,873 | 5/1951 | Musher | 426/436 |
| 3,271,160 | 9/1966 | Kopas | 426/430 |
| 3,395,019 | 7/1968 | Kviesitis | 426/31 |
| 3,573,061 | 3/1971 | Glabe | 426/21 |
| 3,634,093 | 1/1972 | Huang | 426/507 |
| 3,895,003 | 7/1975 | Swain | 426/430 |
| 3,925,569 | 12/1975 | Daftary | 426/430 |
| 4,028,468 | 6/1977 | Hohner | 426/656 |
| 4,072,671 | 2/1978 | Sodini | 426/430 |
| 4,208,259 | 6/1980 | Oughton | 426/436 |
| 4,282,319 | 8/1981 | Conrad | 426/28 |
| 4,315,038 | 2/1982 | Townsley | 426/489 |
| 4,390,469 | 6/1983 | Oughton | 426/430 |
| 4,435,429 | 3/1984 | Barrows | 426/507 |
| 4,462,939 | 7/1984 | Boocock | 426/430 |
| 4,810,519 | 3/1989 | Myers | 426/460 |
| 4,857,356 | 8/1989 | Reinl | 426/28 |
| 4,996,063 | 2/1991 | Inglett | 426/21 |
| 5,013,561 | 5/1991 | Goering | 426/430 |

Primary Examiner—Carolyn Paden
Attorney, Agent, or Firm—Richard J. Hicks

[57] ABSTRACT

An aqueous steeping process for producing a relatively pure bran and flour products from cereal grains such as oats, wheat and rye without conventional dry milling techniques. The aqueous steeped grains are macerated with an ethyl alcohol solution and the bran and flour products recovered therefrom. The aqueous alcoholic waste solutions are further processed by ion-exchange techniques to recover small quantities of high value by-products.

15 Claims, 4 Drawing Sheets

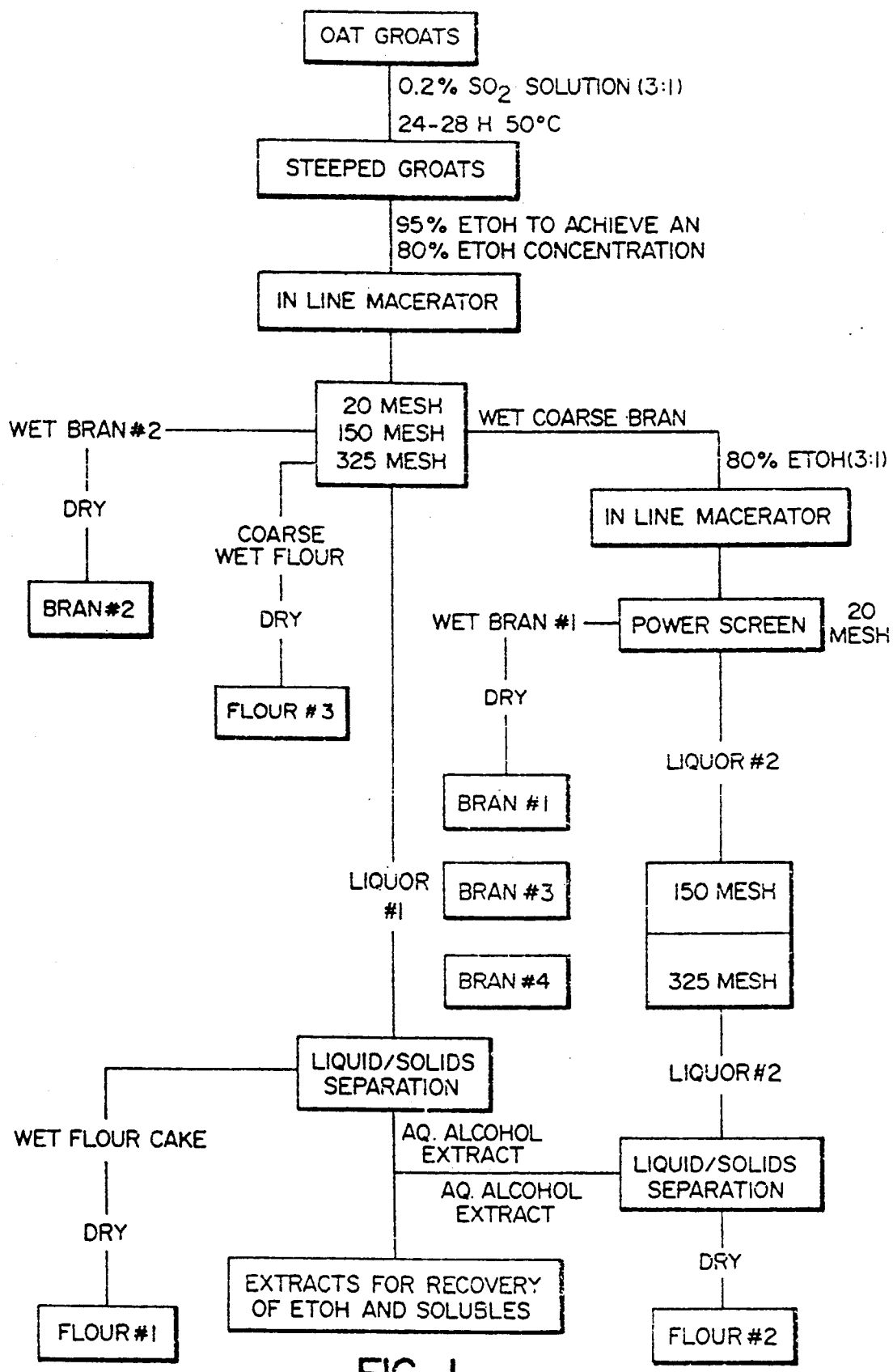
FIG. I

METHOD OF PRODUCING STABLE BRAN AND FLOUR PRODUCTS FROM CEREAL GRAINS

FIELD OF INVENTION

This invention relates to processes for treating cereal grains and recovering bran, flour and minor high value products therefrom. The processes are particularly, but not exclusively, useful for the treatment of oat grains.

BACKGROUND OF INVENTION

In Canadian Patent 1,179,189 an aqueous steeping process for recovering bran and an endosperm flour portion from oat grains is described. In this process oat grains, which cannot be dry milled like corn or wheat grains due to their lipid content, and general kernel softness rae steeped in water so as to liquefy the endosperm. The grain is then split and an oat flour product is recovered from the liquid endosperm portion and a bran product from the insoluble portion. The aqueous treatment does not, however, produce particularly shelf-stable products and it has now been determined that the aqueous bran and flour products can be refined and stabilized by an alcohol extraction process and that several additional added-value products can be recovered, by ion exchange techniques, from the alcoholic extractant. The alcoholic extraction process may be applied to cereal grains such as wheat and rye in addition to oats, but such cereal grains such as barley and corn are not particularly amenable to processing in this manner.

OBJECT OF INVENTION

An object of the present invention is to provide an aqueous alcoholic treatment process for cereal grains so as to produce a flour and other value added products.

Another object is to provide a bran product possessing functionality characteristic of its β-glucan gum component.

Yet another object is to provide stable bran and flour products having improved anti-rancidity.

A still further object is to provide an ion exchange technique for treating aqueous ethanolic treatment solutions so as to recover valuable by-products therefrom.

BRIEF STATEMENT OF INVENTION

By one aspect of this invention there is provided an aqueous alcoholic process for producing relatively pure bran and flour products from cereal grains comprising:
(a) steeping said cereal grains in water for sufficient time to substantially completely liquefy the endosperm content thereof;
(b) macerating said steeped grain in an aqueous ethanol solution so as to liberate said liquid endosperm;
(c) separating and recovering an insoluble bran product from said aqueous ethanol solution;
(d) separating and recovering an insoluble flour from said bran free aqueous ethanol solution; and
(e) recovering a substantially particulate-free aqueous ethanol solution containing soluble cereal grain by-products.

By another aspect of this invention there is provided a substantially pure and stable bran product extracted from a cereal grain selected from oat, wheat and rye, by the process described above.

By yet another aspect of this invention there is provided a substantially pure and stable flour product extracted from a cereal grain selected from oats, wheat and rye, by the process described above.

By still a further aspect of this invention there is provided a process for extracting valuable by-products from an aqueous ethanolic solution derived from cereal grain processing, comprising passing said solution through an anionic exchange column, recovering by-products from an effluent stream, eluting said column and recovering further by-products from an eluate stream.

BRIEF DESCRIPTION OF DRAWINGS

FIG. 1 is a schematic flow diagram of the process according to the present invention;

FIG. 3 and 4 is a partial flow sheet of the ion exchange separation of ethanolic aqueous solutions (strong and weak anionic fractions).

DETAILED DESCRIPTION OF PREFERRED EMBODIMENTS

Figure 2A:
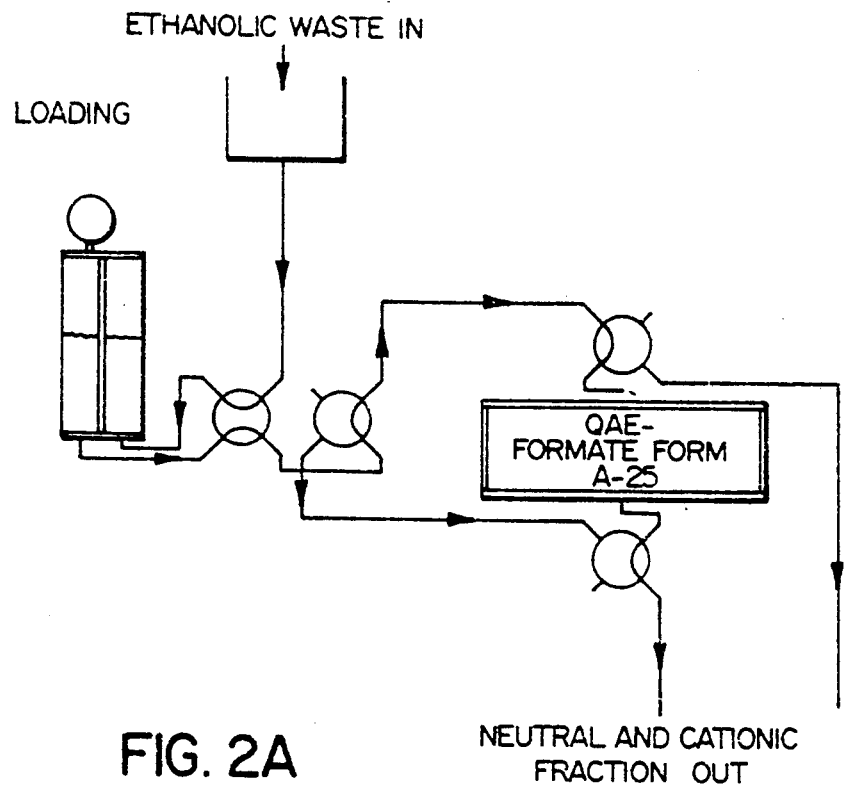
FIG. 2a is a partial flow sheet of the ion exchange separation of ethanolic aqueous solutions (anionic and cationic fractions)

Oats, wheat and rye grain may be steeped in water containing about 0.1% active sulphur dioxide as described in Canadian Patent 1,179,189 supra, but instead of merely crushing or macerating the steeped grain to release the liquefied endosperm, it has now been found advantageous to macerate the grain with ethanol, such as 95% ethanol so as to provide 83% ethanol concentration in the slurry, for a few minutes in an in-line macerator (FIG. 1). Following maceration the endosperm/bran aqueous ethanolic slurry is passed over a 20 mesh screen to separate a coarse bran fraction, which is macerated a second time with the 83% aqueous ethanol, and rescreened to produce a BRAN #1 product. Minor amounts of bran and coarse endospermic flour may be recovered on 150 and 325 mesh screens and the bulk of the de-branned endospermic flour can be recovered, by any conventional liquid/solids separation step, from the liquor passing through the 325 mesh screen to produce a wet flour cake product designated FLOUR #1. The aqueous alcoholic liquors of the various mesh stages, now substantially free of all particulate material can be distilled to recover reusable alcohol or further processed to recover value-added minor soluble components as described in more detail hereinafter.

EXAMPLE 1

Oats 4.5 kg of sound seed at 11.2% moisture of the cultivar TIBOR (a hull-less cultivar), were steeped in 3 parts by weight of water containing 0.1% w/w active $SO_2$ according to the procedures of Canadian Patent 1,179,189 (1984) Burrows et al. The steeped seed (8.8 kg) was macerated in 32.8 kg of 95% ethanol (effective ethanol concentration 83%) by circulating the slurry for five minutes through an in-line macerator (FIG. 1). The slurry was passed over a vibrating screen deck consisting of 20, 150 and 325 mesh stainless steel screens. The impure coarse bran fraction retained on the 20 mesh was macerated a second time in 3 parts of 83% ethanol solution, passed through a power-sieve fitted with a 20 mesh screen and then dried in a stream of air at 80° C. The yield of primary bran flake was 0.67 kg (dm) and is designated as BRAN #1.

A second bran fraction was obtained from the 150 mesh screen of the vibrating deck and air dried to yield 0.180 kg (dm) as BRAN #2. The fraction retained on the 325 mesh screen was observed as a coarse endospermic flour which yielded 0.3 kg (dm) as FLOUR #3. The liquor passing through the 325 mesh deck screen contained the bulk of the debranned endospermic flour. This was subjected to any suitable liquid/solids separation step to yield a wet flour cake which gave 1.841 kg (dm) as FLOUR #1.

The liquor passing the 20 mesh power sieve was passed over a 2 deck vibrating screen (150 and 325 mesh) to yield minor amounts of fractions (0.98 kg (dm) - BRAN#3 and 0.033 kg (dm) - BRAN#4).

The aqueous alcoholic liquors, now freed of all particulate matter, were combined. These may either be distilled directly to recover re-usable alcohol or be further processed to recover specific solubles as well as the alcohol.

The mass balance shows that 87.9% w/w of the starting dry matter of the oat groat was recovered through this process. Solids losses to the steepwater are estimated at 2-3% and the solids soluble in the aqueous alcoholic liquor are in the 9-10% range.

The major BRAN #1 and FLOUR #1 fractions are microbially acceptable.

Tests for lipase activity involving incubation of the components with added triolein (a triglyceride) under controlled buffered conditions did not result in further increases in the basal level of free fatty acids. The bran and flour products were stable over a 9 month storage period.

EXAMPLE 2

The BRAN #1 and FLOUR #1 from Example 1 were analysed as follows:

TABLE 1

| Bran | | Flour |
|---|---|---|
| 24.9% | Protein (N × 6.25) | 17.4% |
| 4.5% | Fat (either extract) | 3.0% |
| 10.9% | Starch | 69.9% |
| 54.9% | Total Dietary Fibre | 3.0% |
| 35.9% | Insol. Dietary Fibre | 0.45% |
| 19.4% | Soluble Dietary Fibre | 2.55% |
| 93.5% | Total Dry Matter | 93.2% |

Milling steeped oats in aqueous alcohol has the added advantage of causing the β-glucan gum component of the subaleurone cell walls to be retained in the bran. It is believed that during steeping, this gum becomes hydrated and upon contact with the alcohol is dehydrated. This has the effect of confering on the bran a kind of "instantizing" of the gum such that when a powdered form of the bran is dispersed in water, the slurry quickly thickens into a smooth viscous fluid within one hour. Currently, commercial oat bran preparations contain the β-glucan gum component in the range 8-11% w/w, i.e., approximately 50% of the gum content of the alcohol milled steeped bran. When dispersed in water at a solids level such that the effective gum content of each is normalized to 0.9% w/w, the slurries after one hour of stirring are found to possess markedly different viscosities of consistencies. This is illustrated in Table 2.

Guar and Xanthan gums, two commonly used commercial gum hydrocolloids, are cited for comparative purposes. Thus, alcohol milled steeped oat bran produces a consistency and flow behaviour more like Guar gum than Xanthan gum.

TABLE 2

| Thickening Agent[a] | Consistency Coeff (m) (pa · S) | Flow Index (n) |
|---|---|---|
| Commercial Oat Bran | 0.501 | 0.616 |
| Alcohol Milled Steeped Bran | 8.835 | 0.245 |
| Guar Gum | 14.98 | 0.241 |
| Xantham Gum | 3.078 | 0.315 |

[a]All thickeners suspended in water at 22° C. such that the effective gum level in each is 0.90% w/w.

U.S. Pat. No. 4,028,468 to Hohner and Hyldon teaches the isolation of β-glucan gum from an oat bran by co-extraction of the gum with protein, followed by protein precipitation. The gum may be isolated by adding sufficient alcohol to precipitate it. In contrast, the present invention illustrates that it is possible to produce an oat bran preparation which is sufficiently high in β-glucan gum content where the gum has been "instantized" as a result of the alcohol milling and steeping process. This product readily hydrates and produces slurries that display the characteristic viscosity (consistency) and flow behaviour of the isolated gum. Avoiding the need to isolate the gum component offers certain economic savings in both capital equipment and operating costs and results in an oat bran preparation high in dietary fibre, but also possessing unique viscosity building functionality.

EXAMPLE 3

Wheat 4.5 kg of sound Hard Red Spring wheat (10.2%) H$_2$O were processed similar to Example 1. Four fractions were obtained as follows:

The primary flour (FLOUR #1)=1.07 kg (dm); a flour fraction retained on the 150 mesh screen of the triple vibrating screen deck (0.92 kg dm); a flour fraction retained on the 150 mesh screen of the double vibrating screen deck (0.435 kg dm) and a primary bran fraction from the 20 mesh power screen (0.843 kg dm). Total material yield was 80% w/w (dm). Higher than expected losses occured in lines and pump heads since the wheat solids tended to quickly settle out of suspension, necessitating disassembly of the system to clear blockages.

The protein content of each fraction in given in Table 3.

TABLE 3

| Fraction | % Yield (dm)[a] | % Protein (N × 5.7) |
|---|---|---|
| Original wheat | — | 15.02 |
| Flour #1 | 32.75 | 5.97 |
| Flour #2 | 28.15 | 20.27 |
| Flour #3 | 13.31 | 22.10 |
| Bran | 25.80 | 16.14 |

[a]based on (dm) total recovery of all fractions.

Thus, substantial protein shifts have occurred as a result of wet milling steeped wheat kernels in aqueous alcohol. Protein shifts have previously been reported by Wall et al., (7th Nat. conf. of Wheat Utilization Research, Kansas, 1971). However, the starting material was a pin-milled wheat flour. The data is given in Table 4 for a Hard Red Spring Wheat flour.

TABLE 4

| Fraction | (Wall et al., 1971) % Yield (14/H$_2$O basis) | % Protein (N × 5.7) |
|---|---|---|
| Original Flour | — | 12.8 |
| Flour A | 18.8 | 19.4 |
| Flour B | 49.5 | 8.7 |
| Flour C | 31.7 | 14.2 |

EXAMPLE 4

Rye 4.5 kg of a Winter Rye cultivar (PUMA), (12.7% H$_2$O) were processed in a fashion similar to that described in Example 1.

Four fractions were produced as follows: Primary Flour (0.724 kg dm); Flour from 150 mesh screen of triple deck (0.838 kg dm); flour from 150 mesh screen of double screen deck (0.264 kg dm) and Bran (1.20 kg dm).

The flours appeared contaminated by fine bran and the bran was contaminated by adhering flour. Total yield was 77.03% dm. Again as in wheat, the density of the solids particles causes process operating problems resulting in material losses.

Examples 3 and 4, while not optimum, do illustrate that the aqueous alcohol wet milling of oats can be extended to other cereals such as wheat and rye. Tritacale, although not tested, might be expected to process in a similar fashion.

Although application of the alcohol milling steeped grain process can be applied to wheat and rye, the bran products of Examples 3 and 4 do not display the functionality (viscosity building) displayed by the oat bran of Example 1.

Wheat bran does not contain high levels of β-glucan gum, while rye bran, although containing this component, also contains substantial amounts of rye flour. It is also possible that within the operating parameters of this invention, the rye β-glucans do not become as hydrated as they do in oats.

The ethanolic waste solutions from the above treatments may, as indicated, be distilled to recover reusable alcohol directly or they may, according to further embodiments of the invention, be further processed by the use of anionic and/or cationic ion exchange resins to recover further minor but economically valuable products. The further processing of the aqueous ethanolic solutions will be illustrated by way of example, it being appreciated that the alcoholic solutions from processing any of the cereal grains amenable to the processing steps described above in details may be used.

EXAMPLE 5

Figure 2B:
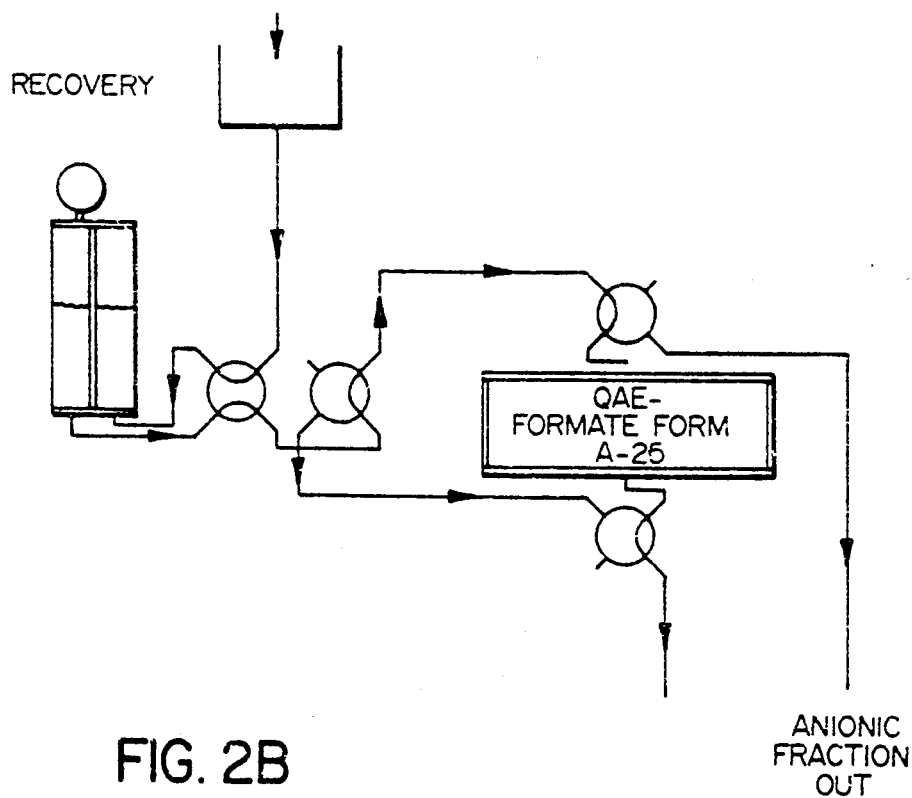
FIG. 2b is a partial flow sheet of the ion exchange separation of ethanol water, formic acid solutions (anionic fractions).

Hull-less whole oats (Avena sativa L. cult TIBOR) were steeped and commuted with ethanol:water to give various solids (bran, flour, etc.) by the process of Example 1, and a waste ethanol:water stream. The amount of effluent waste stream generated was approximately 80 litres per 4.5 kg initial weight of oats being processed. The composition of the stream was approximately 80% ethanol containing not more than 6.75 gm/litre total solubles (≃12% of initial weight dissolved in 80 litres: $0.12 \times 4.5 \times 10^3 \times 0.0125$ gm/litre). Eight consecutive steeps were carried out and the ethanolic waste streams combined to give 640 litres of filtered ethanolic solution containing approximately 4.32 kg dissolved solids. The column recovery system (FIG. 2) consisted of 16 litres bed volume Sephadex ®25 Anion Exchanger (Quaternary aminoethanol-substituted dextran beads, in the formate form, pre-equilibrate and packed in 80% ethanol). The ethanolic waste stream was passed through the column by gravity feed (constant pressure mariot device; 3 meters hydrostatic drop; flow rate approximate 380 ml/min). After all waste effluent had been loaded, the interstitial liquid was displaced using a further 35 litres of 80% ethanol (approximate running time for 675 litres: 30 hrs.). This clear, pale yellow effluent, hereafter referred to as the NEUTRAL PLUS CATIONIC FRACTION was stored at room temperature until further utilized. The KS 370 column was then eluted with 2 bed volumes (32 litres) of the (freshly-prepared) solvent system Ethanol:H$_2$O:formic acid (70:25:5 v/v/v as %) to give a clear, greenish-yellow solution. This eluate hereafter referred to as the ANIONIC FRACTION, was then evaporated to a thick greenish yellow syrup, resuspended several times in 3 litres of 80% ethanol and reevaporated to remove the last traces of formic acid. The final syrup (≃150 ml) was dispersed in 2 litres of isopropanol:water (2:1 v/v).

a) Analyses of the ANIONIC FRACTION: Quantitative and qualitative proximate analysis were performed as follows: Qualitative analysis of the mixture was carried out by comparative thin-Layer chromatography (TLC) with appropriate standards and chromogenic detecting reagents as shown in Table 5.

TABLE 5

| Phenolic Acids: | TLC on silica gel G (Baker-Flex ® 1B2-F layers) solvent: CHCl$_3$:HOAc (95:5) detection: 0.1% diphenyl borinate: with 5% ethanolamine overspray: UV light ferulic acid; p-coumaric acid: caffeic acid |
|---|---|
| Alkaloids: | TLC on silica gel G (Baker-Flex ® 1B2-F layers) CHCl$_3$:iso-propanol: HOAc (90:5:5) ethanolamine spray; Avenanthramides A, B, C, D, E, F, G, H, K, L, M, N, O, P, Q, R, S, T, U (as defined in Table 6) and several, as yet undefined structural analogues. Total Content; 2.2 gm. |
| Fatty Acids | -> (stearic), palmitic, oleic, linolenic, linoleic |
| Organic Acids | -> Malic, citric |
| Amino Acids | -> Glutamic, Aspartic and traces of at least five others. |

TABLE 6

STRUCTURES OF E-ISOMERS OF OAT AVENANTHRAMIDES

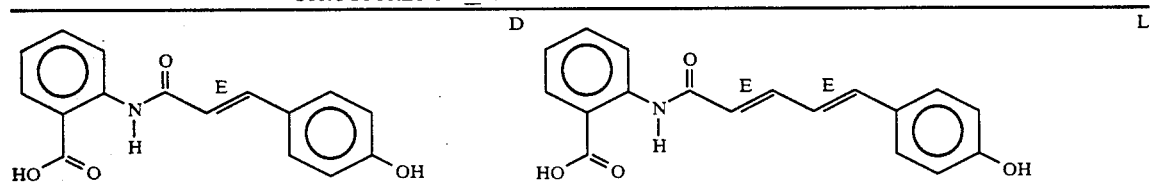

TABLE 6-continued
STRUCTURES OF E-ISOMERS OF OAT AVENANTHRAMIDES
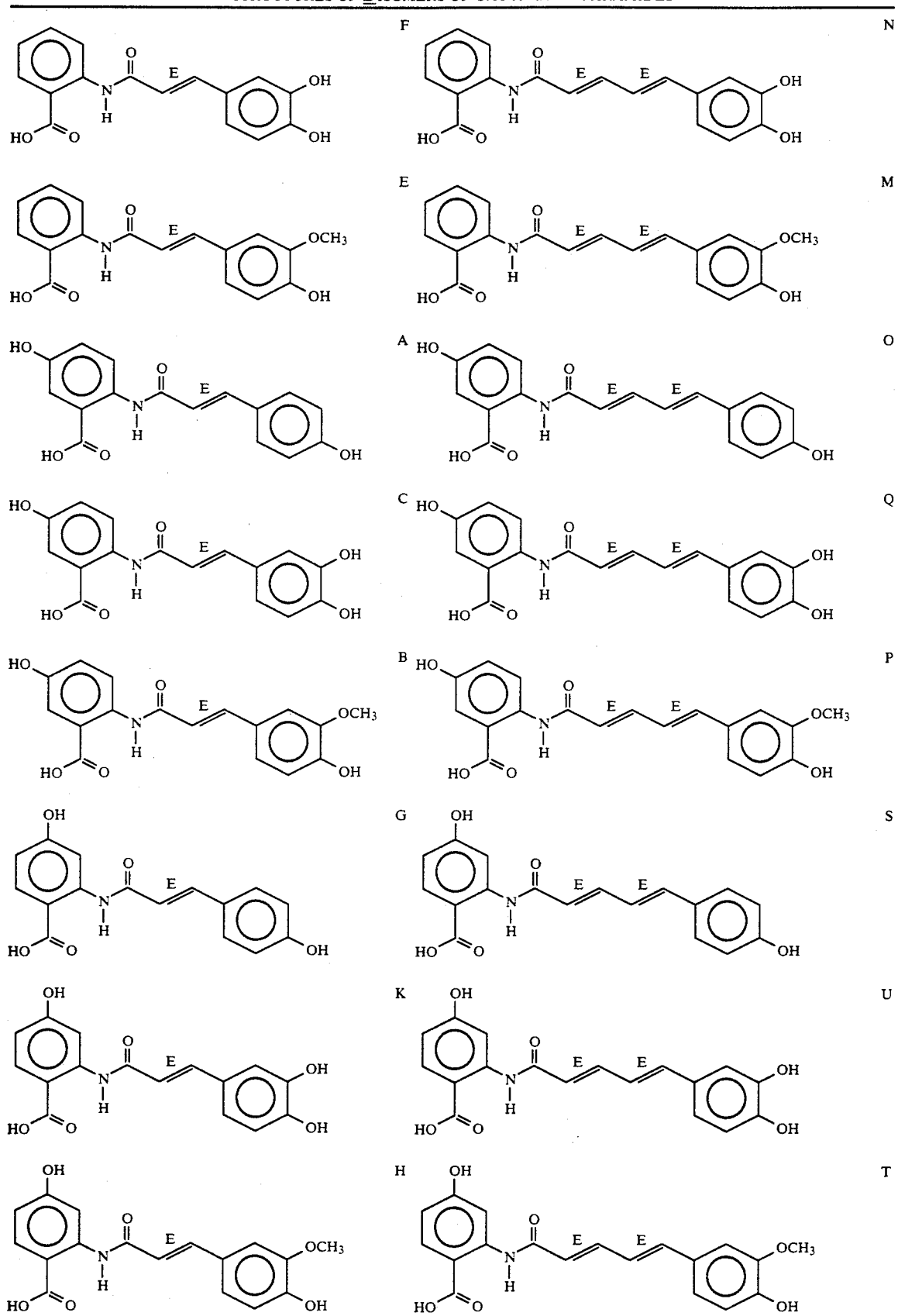

TABLE 6-continued
STRUCTURES OF E-ISOMERS OF OAT AVENANTHRAMIDES

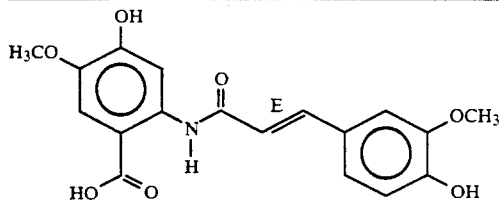

EXAMPLE 6

Figure 3A:
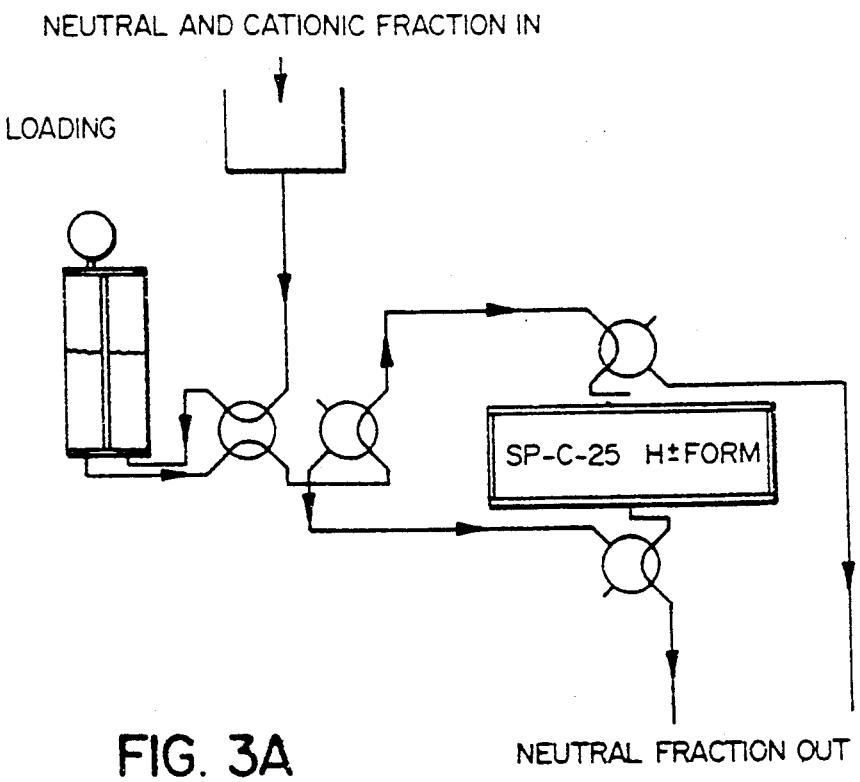
FIG. 3 and 4 is a partial flow sheet of the ion-exchange separation of ethanolic aqueous solutions (neutral fractions)
Figure 3B:
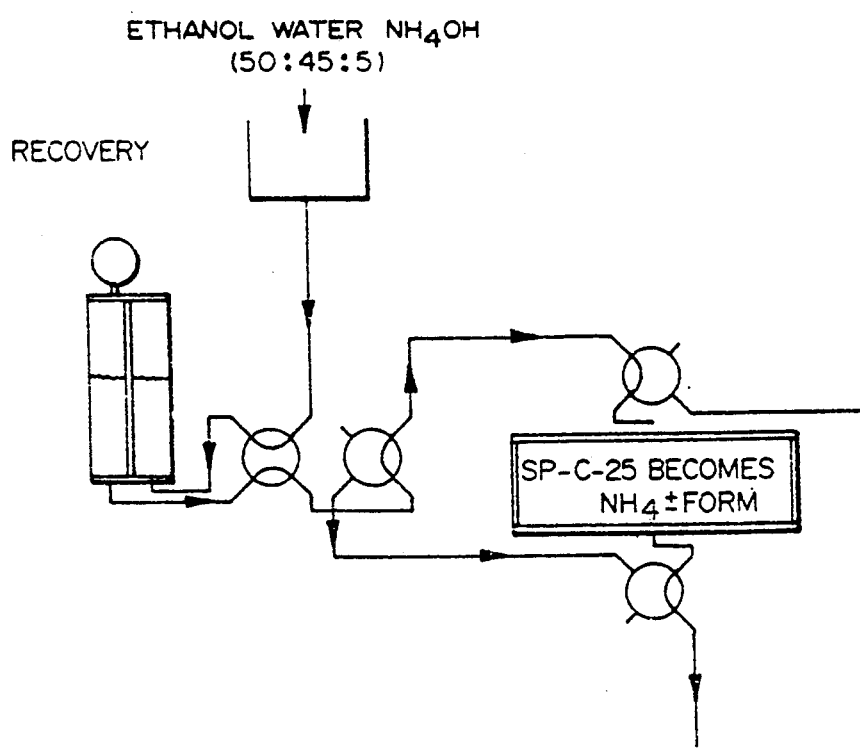

The NEUTRAL AND CATIONIC FRACTION prepared from the 4.5 kg steep of Example 5 was further fractionated by passing the processing stream outflow, from the Anion exchange column, directly through a cation exchange column consisting of Sephadex ® C-25 Cation Exchanger (sulfopropyl-substituted dextran beads in the hydrogen form pre-equilibrated in 50% Ethanol). When all effluent stream had been passed through the column, the column was washed with a further 2 bed volumes of 50% Ethanol and combined with the eluate to give a non-absorbed fraction which had in effect passed through both anion and cation exchangers and is referred to hereafter as the NEUTRAL FRACTION (FIG. 3b). This NEUTRAL FRACTION was stored at room temp. until further analyzed. The column was then eluted with the solvent Ethanol:$H_2O$:conc. $NH_4OH$ 50:45:5 v/v/v using bed volumes of solvent. The resulting eluate, termed the CATIONIC FRACTION was concentrated under reduced pressure, and resuspended and re-evaporated to a reddish-brown laquer and dissolved in 50% aqueous isopropanol.

a) Analysis of the NEUTRAL FRACTION Qualitative analyses of the neutral fraction was carried out using comparative Thin-Layer Chromatography, with appropriate standards and chromogenic detecting reagents. After the ethanol was recovered from the neutral fraction (≈90 litres 80% ethanol) the remaining syrup (bright yellow, butter-like .pa oil) was taken up in 50% aqueous isopropanol and used for analysis.

TABLE 7

| | |
|---|---|
| Free Sugars: | TLC; Avicel layers (Baker-Flex ®; Cellulose: Ethylacetate pyridine $H_2O$: 12:3:5 / / aniline phthalate spray: Glucose, galactose, arabinose, xylose and an unknown reducing sugar resembling ribose Phenolics: Flavonoids: TLC polyamide 6.6 detection reagent 1% diphenylborinate with 5% ethanolamine overspray. Quercetin, Kaempferol, Tricin, Apigenin, Luteolin, Orientin, Iso-orientin, Quercetin-3-rutinoside and 30 or 40 additional glycosides. Triterpene: TLC, Silica Gel G (Baker-Flex ® 2-F; $CHCl_3$: Glycosides $MeOH:H_2O$ 70:28:2; detection 5 1% vanillin in 5% $H_2SO_4$ in 50% isopropanol) Avenacoside, Desglucosyl-avenacoside and 5 additional glycosides of incompletely characterized chemistry. |
| Alkaloids: | Avenacin A, Avenacin A-1 Avenacin B, Avenacin B-1 (same solvent as above). Lipids: A number of mono-, di- and tri-acyl glycerides; monoglycosyl monoglycerides diglycosyl monoglycosyl monoglycerides diglycerides glycerol; stigmasterol (TLC $CHCl_3:MeOH:HOAc$:Silica Gel G; $H_2SO_4$ spray. |

TABLE 7-continued
$CHCl_3$:EtoAc:etc.

EXAMPLE 7

Figure 4A:
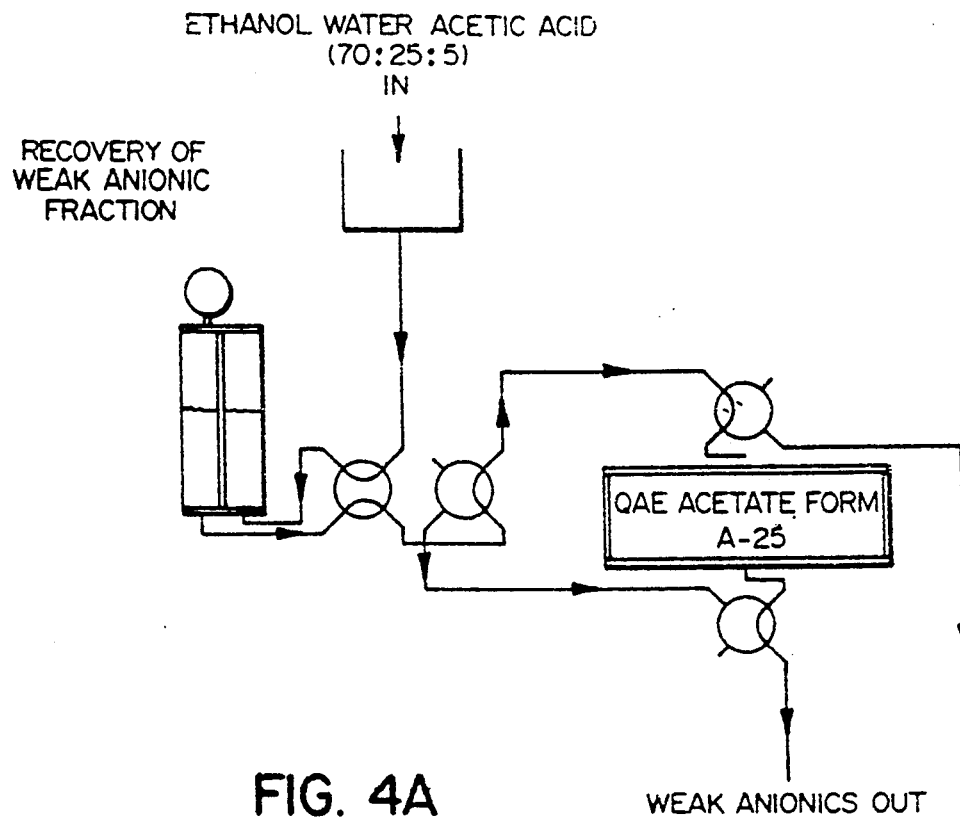
Figure 4B:
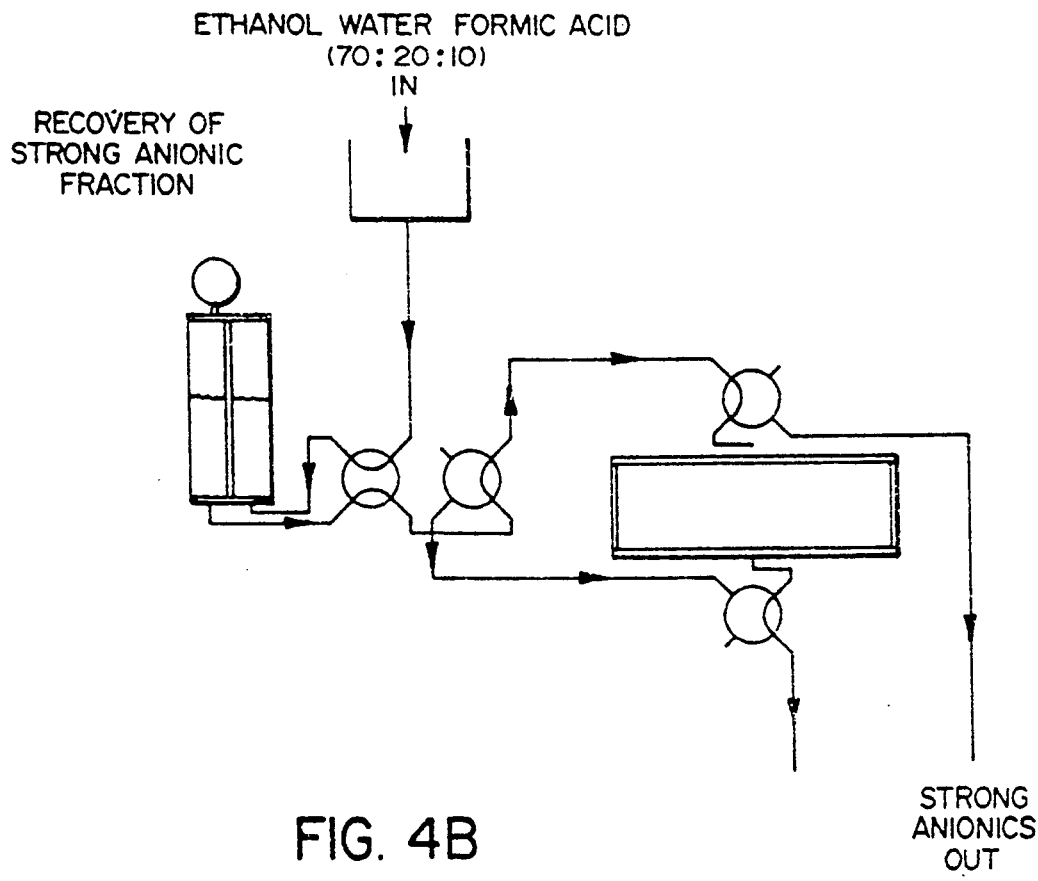

4.5 kg of sound hard red spring wheat were processed in a fashion similar to the oats of examples 1 and 5. The ethanol water 80:20 waste stream after filtration through cloth filter (clear, pale yellow liquid) was then fed through an Anion exchanger consisting of Sephadex ® A-25 (QAE, in the acetate form: pre-equilibrated in 80% ethanol) (bed volume 200 mls: 3 meter hydrostatic pressure; flow rate≈80 mls/min; total volume effluent 80 litres; total time 16.7 hrs operating time). The eluate (clear pale yellow solution) termed the NEUTRAL and CATIONIC FRACTION was used for other studies and the ethanol recovered. A further 400 mls (2 bed volumes) of 80% ethanol solvent was passed through the column to displace the interstitial effluent which was combined with the NEUTRAL and CATIONIC FRACTION described above. The anions captured by the gel were first eluted with 800 ml. (i.e. 4 bed volumes) of the solvent Ethanol:water:glacial acetic acid (70:25:5) to give a fraction called the WEAK ANION FRACTION. This fraction was evaporated under reduced pressure to give an amber coloured syrup. The syrup was resuspended and re-evaporated several times with 100 mls 80% ethanol to remove the last traces of acetic acid and the final syrup taken up in isopropanol:water (67:33). The column was then eluted with 800 mls (4 bed volumes) of the solvent ethanol:water:formic acid (70:20:10) to give a fraction term the STRONG ANION FRACTION. This fraction was treated as described above for the weak anion fraction to give a deep blue-purple solid solubilized in isopropanol:water (67:33). Finally the column was recycled according to a modification of manufacturers specifications using dilute alcoholic HCl; dilute alcoholic $NH_4OH$ and finally re-equilibrated in the acetate form using dilute alcoholic acetic acid. The fractionation and recycling process is summarized in FIG. 4.

a) Analyses of the WEAK ANION FRACTION Qualitative analyses were performed as outlined below using comparative TLC using appropriate standards and chromogenic detecting reagents as shown in Table 8.

TABLE 8

| | |
|---|---|
| | Phenolic Acids: TLC on silica Gel G (Baker-Flex ® 1B2-F) solvent. $CHCl_3$:HOAc 95:5 ferulic; p-coumaric; and caffeic (trace) + series of unidentified conjugated forms of the above (not avenanthramides). |
| Fatty Acids: | palmitic, oleic, linoleic |
| Organic Acids: | not detected. | b) Analyses of the STRONG ANIONIC FRACTION Qualitative analyses were performed as outlined below using comparative TLC using appropriate standards and chromogenic reagents (Table 9).

TABLE 9

|  | Phenolics: A new type of phenolic pigment of unknown precise structure soluble in aqueous alcohol with unusual properties of blue in acid solution and pink-red in alkali: stable for at least 6 months in aqueous alcohol at pH 3 to 11. No avenanthramides. |
|---|---|
| Phosphatides: | Lecithins TLC (CHCL$_3$:EtoAc) phosphomolybdate reagent |
| Organic Acids: | malic acid, (tartaric acid?) (citric acid?) |
| Amino Acids: | glutamic acid, aspartic acid and several others |
| Uronic Acids: | glucuronic acid, galacturonic acid and traces of several others. |

EXAMPLE 8

In this example, the waste ethanolic effluent from the processing of rye by the process outlined in Examples 1 and 5 was diluted to 50% ethanol from 80% ethanol previously used. The purpose of doing so was twofold: First, the presence of alkylresorcinols in rye extracts prepared with non-aqueous solvents (e.g. chloroform, acetone, 100% methanol, 100% ethanol) or extracts containing relatively little water (e.g. 90%, 80% lower alcohols) is known. By diluting the 80% to 50% ethanol it was anticipated that the majority of these lipophilic compound would be precipitated. Secondly, the example of processing the effluent in 50% rather than 80% ethanol would further emphasize the adaptive utility of the ion-exchange procedure to a broader range of processing conditions.

4.5 kg of winter rye (*Secale cereale* L. CULT. PUMA) was processed as previously described above for wheat and oats to give 80 litres of filtered 80% ethanol waste effluent. The effluent was mixed with sufficient water to reduce the ethanol content to 50% prior to further processing. The addition of water to the 80% ethanol produced a flocculent precipitate which was removed by sedimentation. After standing for 1 week the clear supernatant was recovered by careful decantation. The precipitate sludge (pale yellow-brown) was recovered by filtration dried under vacuum and analyzed separately. The clear pale yellow supernatant 50% ethanol (i.e. waste effluent) was then used in the following tandem ion exchange process similar to that utilized in the oat treatment described in Example 5. The column recovery system consisted of separate Sephadex ® A-25 and C-25 dextran-gels approximately 200 mls. bed volume each. The A-25 gel was prepared in the acetate form and the C-25 gel in the hydrogen ion form. Both gels were pre-equilibrated and packed in 50% ethanol. The ethanolic waste stream (approx. 128 litres) was passed through the anion exchange column by gravity feed (3 meter hydrostatic drop) and directly through the cation exchange column. The interstitial liquid remaining in the columns after all effluent had entered was displace by washing the columns with a further 1.0 litre of 50% ethanol. The clear, pale yellow effluent from the tandem columns, hereafter referred to as the NEUTRAL FRACTION was concentrated by rotary evaporation to a thick pale greenish-yellow syrup. The trapped solvent was used for solvent recovery of the ethanol by distillation (azeotropic ethanol) for re-use. Samples of the waste effluent taken at various stages of the ion exchange procedures showed the following pH values. Initial pH 7.0 prior to treatment; effluent after passage through anion exchanger: pH 6.3; effluent after further passage through cation exchanger: pH 6.3; NEUTRAL FRACTION after solubilization in 50% ethanol: pH 7.0.

The columns were eluted separately to recover the ANIONIC FRACTION (column elution with 4 bed volumes ethanol:water:glacial acetic acid 50:45:4) and the CATIONIC FRACTION (column elution with ethanol:water:conc NH$_4$OH 50:45:5). The individual ANIONIC and CATIONIC FRACTIONS were concentrated to brownish yellow lacquers under reduced pressure by rotary evaporation at 40° C. In both cases, the residues were resuspended and re-evaporated several times with 300 mls. 50% ethanol to remove the last traces of either acetic acid (anionic) or ammonia (cationic). The final residues were taken up in 50% iso-propanol for further analyses.

a) Analyses of the ANIONIC FRACTION Qualitative analysis was performed using procedures outlined in Example 5. A similar pattern to that of wheat was observed. No avenanthramides were detected in this fraction.

b) Analyses of the CATIONIC FRACTION Qualitative analysis was performed using standard thin-layer chromatographic techniques (Table 10).

TABLE 10

| Amino Acids & Peptides: | TLC Avicel layers (Baker-Flex ®; cellulose; Butanol: acetic acid: water 55:15:30 / / , ninhydrin reagent). |
|---|---|
| Amines | Spermine, Spermidine and Putrescine (both free and as conjugates with unidentified phenolics) Choline, Ethanolamine. | c) Analysis of the NEUTRAL FRACTION Qualitative analysis of the fraction was performed using procedures outlined for oats in Part 1 Example 6(*a*). The results are summarized in Table 11.

TABLE 11

| Free Sugars | TLC; Avicel layers (Baker-Flex ®; Cellulose; Ethyl acetate:pyridine:water 60:15:25 v/v/v ; aniline phthalate reagent) Glucose, galactose, arabinose (plus traces cellobiose or maltobiose) |
|---|---|
| Phenolics | TLC; Silica Gel G (Baker-Flex ® B2-F; Ethyl acetate:MEK:water:formic acid 50:30:10:10 v/v/v/v) detection using diphenylborinic acid ethanolamine complex). Orientin, iso-orientin, apigenin-7-0-glucoside and at least 15 other unidentified flavonoid glycosides and aglycones. |
| Amino Acids | Numerous amino acids including Glutamine, Asparagine, Phenylalanine, Tyrosine, Leucine, Isoleucine, Tryptophan, Serine, Threonine were readily detectable in this fraction. (TLC for amino acids as described above was used). Numerous peptide and/or amino acid conjugates separated but not identified as well. |
| Lipids | A number of mono- and di- acyl glyderides; diglycosyl monoglycerides; free glycerol several uncharacterized sterols as conjugates (stigmasterol, cycloartenol, sitosterols) (TLC:CHCl$_3$:Acetic acid 95:5 H$_2$SO$_4$ charring) no evidence of either Avenacosides or Avenacins found in this fraction (cf. oats). | d) Analysis of the precipitated sludge The dried yellow-brown sludge precipitated in the ethanol waste liquors and recovered by filtration, was taken up in iso-propanol and subjected to analysis by TLC (reverse phase $C_{18}$ layers; solvent: Acetone:Methanol:water 50:35:15, detection by vanillin-sulfuric acid chromogenic reagent resorcinols; Also analysis by HPLC, GC and mass spectroscopy). The sludge was found to contain a complex mixture of 5-n-alkyl-, 5-n-alkenyl-, 5-n-alkyldiene- and 5-n-alkyltriene resorcinols:

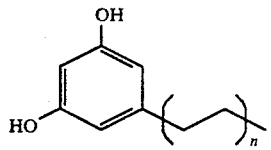

1. n = 7, 8, 9, 10, 11, 12
2. n = 8, 9, 10, one double bond
3. n = 8, 9, 10, two double bonds The cationic fraction from Example 6 was further analysed and shown to contain a minor group of arylamine derivatives, which are herein described as Phenamines, which consist of a series of glycosides of 2-aminophenol. The glycosides consist of one or more glucose moieties attached by β-glycosidic linkage to the phenolic hydroxyl function. In addition, some phenamines appear to contain glactose as well as glucose. They are readily hydrolyzed non-enzymatically by weak acid and enzymatically with β-glucosidases (almond, yeast, bacterial) to give the sugar and the unstable aglycone 2-aminophenol. This aglycone spontaneously oxidizes in air to give the dimer 2-aminophenoxazin-3-one. The phenamines are not restricted to rye, and have been detected in a number of other monocot cereal grains by virtue of the free arylamine function. Using histochemical techniques on sectioned grains, the phenamines have been detected in oats, wheat, barley, rye and corn, and appear to be specifically localized in the aleurone cells. Until recently the exact structures of these phenamines and their spontaneous dimerization to 2-aminophenoxazin-3-one after hydrolysis was not known. This dimeric aglycone does not appear to be present in undamaged grains but can readily be produced in broken or damaged grains presumably by the action of endogenous β-glycohydrolases. Due to their specific localization only in aleurone cell, the content in whole grains and whole grain flours is low but in mill fractions such as bran or bran-enriched mill streams the concentration may be as high as 0.1% dry weight. To date no studies on the biological activity of the naturally-occurring glycosides have been carried out but the dimeric aglycone 2-aminophenoxazin-3-one is a well known antibiotic first isolated from Streptomyces spp. and marketed as Questiomycin A ®. Preliminary evaluation of 2-aminophenoxazin-3-one from hydrolyzed phenamines in association with ruminant nutrition has shown some remarkable properties and potential applications at this time.

The fact that 2-amino-phenoxazine-3-one, produced from the o-aminophenoxyglycosides found in grains, appears to act specifically to inhibit the growth of cellulolytic anaerobic bacteria of rumen origin, while having no apparent effect on non-cellulolytic species from the same environment, has a number of practical implications.

1. The compounds may play a role in the well known tendency of grains to inhibit fiber digestion in ruminants. In this case, the development of antagonists, or of grains with lower levels of o-aminophenoxyglycosides, would be economically worthwhile. The same compound might be playing a significant role in slowing industrial fermentations based on cellulosic substrates, in which case the use of antagonists or the removal of the compound from the fermentation feed stock would be of great economic significance.

2. The mechanism by which 2-amino-phenoxazin-3-one inhibits cellulolytic rumen bacteria is unknown, but if it proves that the inhibition of cellulolytics is a general phenomenom the compound would have widespread application in preventing cellulose degradation both in natural environments (i.e., as a wood preservative) and in industrial processes, particularly those based on the biological degradation of xylans, hemicelluloses, etc., for the production of high quality papers and other fiber products. In these cases the major problem in the process is preventing the growth of cellulolytic organisms while encouraging the growth of organisms degrading other polysaccharides, and the specificity of 2-amino-phenoxazin-3-one is unique in solving this problem.

The avenanthramides described in Table 6 are believed to represent a group of over 50 members (including isomers) of alkaloids present in oat grains, but not in wheat, barley or rye. The avenanthramides consist of conjugated forms of the aminophenolic acids, anthranilic, 5-hydroxyanthranilic, 4-hydryxanthranilic and presumably 5-hydroxy-4-methoxyanthranilic acid. The conjugated forms contain various hydroxy/methoxy-substituted cinnamic or phenylpentadienoic acids attached via "pseudopeptide" linkage to the amine function of the aminophenolic moiety. They are present in oat hulls and groats and appear to be concentrated in the peripheral regions of the grain. In oat processing waste streams they are present in the waste effluent in low concentration but are readily removed in the anion exchange recovery system. Based on these conditions (not optimzed) for extraction, the content is approximately 2.2 gms in 36 kg of whole oats (0.06%) expressed as Avenanthramide A equivalents.

Studies on the biological activity of avenanthramides show that they can be used in potent antihistaminic, antiallergic and antiasthmatic drugs, and as an in vitro lipoxygenase inhibitor. (Japanese Patent #60,152, 454: 1986). However, until now it was not known that any of these compounds occurred naturally. The cyclodehydration products, the avenalumins, have been shown to possess potent antifungal properties. Once again, no mention has heretofore been made of the occurrence of the avenanthramides, but it has now been shown that on contact with water, the avenalumins in fact are rapidly hydrolyzed to produce the corresponding avenanthramides, and that the biological activity is in all probability due to the avenanthramide, rather than the avenalumin analogue.

We claim:

1. An aqueous alcoholic process for producing relatively pure and stable bran and flour products from cereal grains containing an endospermic flour and a bran, comprising:
   (a) steeping said cereal grains in water for sufficient time to substantially completely liquefy the endospermic content thereof;
   (b) macerating said steeped grain in an aqueous ethanol solution so as to liberate said liquified endospermic content from said bran;
   (c) separating and recovering said bran as a stable, insoluble bran product from said aqueous ethanol solution;
   (d) separating and recovering the endospermic content as a stable, insoluble flour from said bran free aqueous ethanol solution; and (e) recovering a substantially particulate-free aqueous ethanol solution containing soluble cereal grain by-products.

2. A process as claimed in claim 1 wherein said cereal grain is selected from oats, wheat and rye.

3. A substantially pure and stable bran product prepared from a cereal grain selected from oat, wheat and rye, by the process of claim 1.

4. A substantially pure and stable flour product prepared from a cereal grain selected from oats, wheat and rye, by the process of claim 1.

5. A process as claimed in claim 1 including passing said particulate free aqueous ethanol solution through an anionic exchange column, recovering a cationic and a neutral fraction effluent, eluting an anionic fraction from said column with a volatile weak acid and recovering by-products from said effluent and said eluate.

6. A process as claimed in claim 5 including passing said effluent through a cationic exchange column, recovering a neutral fraction effluent, eluting a cationic fraction from said column with a volatile weak base and recovering by-products from said effluent and said eluate.

7. A process as claimed in claim 6 wherein said cationic exchange column is charged with a cationic exchange resin selected from a cross linked dextran based resin and a cross linked agarose based resin.

8. A process as claimed in claim 7 wherein the by-products recovered from said effluent include free sugars, phenolics, triterpeneglycosides, avenacin A, avenacin A-1, avenacin B, avenacin B-1 and lipids.

9. A process as claimed in claim 7 wherein the by-products recovered from said eluate include free sugars, phenolics, amino acids and lipids.

10. A process as claimed in claim 5 wherein said anionic exchange column is charged with an anionic exchange resin selected from a cross linked dextran based resin and a cross linked agarose based resin.

11. A process as claimed in claim 10 wherein the by-products recovered from said eluate include phenolic acids, alkaloids, avenanthramides, fatty acids, malic and citric acids, and amino acids.

12. A substantially pure and stable oat bran product enriched in beta-glucan and prepared by the process of claim 1.

13. A substantially pure and stable oat endospermic flour depleted in beta-glucan and prepared by the process of claim 1.

14. A process for extracting valuable by products contained in an aqueous ethanolic solution derived from cereal grain processing, comprising passing said by-product-containing solution through an anionic exchange column, recovering soluble said by-products from an effluent stream, eluting said column with a volatile weak acid and recovering said by-products from an eluate stream.

15. A process for extracting valuable by-products as claimed in claim 12 including passing said effluent stream through a cationic exchange column, recovering additional by-products from a second effluent stream, eluting said column with a volatile weak base and recovering said by-products from a second eluate stream.

* * * * *